March 5, 1957 W. F. BRAUER ET AL 2,784,285
BRAZING APPARATUS
Filed April 29, 1954 3 Sheets-Sheet 1

INVENTORS:
W. F. BRAUER
T. W. KALBOW
BY C. B. Hamilton
ATTORNEY

March 5, 1957 W. F. BRAUER ET AL 2,784,285
BRAZING APPARATUS

Filed April 29, 1954 3 Sheets-Sheet 3

INVENTORS:
W. F. BRAUER
T. W. KALBOW
BY C. B. Hamilton
ATTORNEY

2,784,285

BRAZING APPARATUS

William F. Brauer and Theodore W. Kalbow, Chicago, Ill., assignors to Western Electric Company, Incorporated, New York, N. Y., a corporation of New York Application April 29, 1954, Serial No. 426,433

8 Claims. (Cl. 219—7.5)

This invention relates to brazing apparatus, and more particularly to apparatus for brazing nested articles together.

An object of the invention is to provide new and improved brazing apparatus.

Another object of the invention is to provide apparatus for brazing nested articles together.

A further object of the invention is to braze a multiplicity of nested articles together simultaneously while accurately positioning all of the articles relative to the brazing apparatus.

A brazing apparatus illustrating certain features of the invention may include a plurality of spring pressed supports mounted on a removable plate in spaced relationship one to another for supporting cup-shaped articles thereon. An elongated split induction heating coil is provided with sockets into which the supports may move articles to be brazed and Lavite rods extend through the coil to space articles to be brazed together in the sockets.

A complete understanding of the invention may be obtained from the following detailed description of the apparatus forming a specific embodiment thereof, when read in conjunction with the appended drawings, in which Fig. 1 is a fragmentary, front elevation of an apparatus forming one embodiment of the invention with portions thereof broken away to more clearly illustrate the invention;

Figure 1:
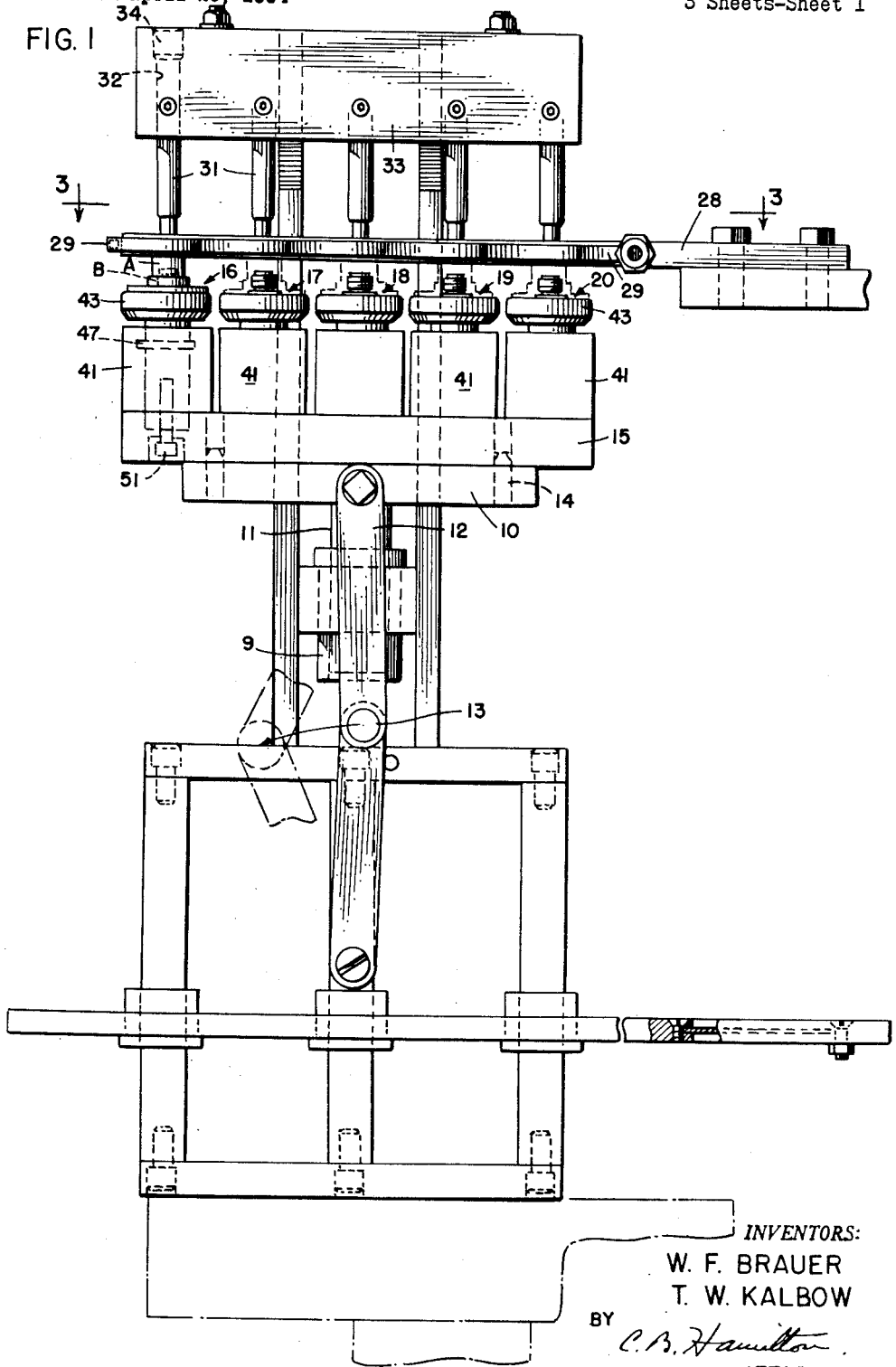
Figure 2:
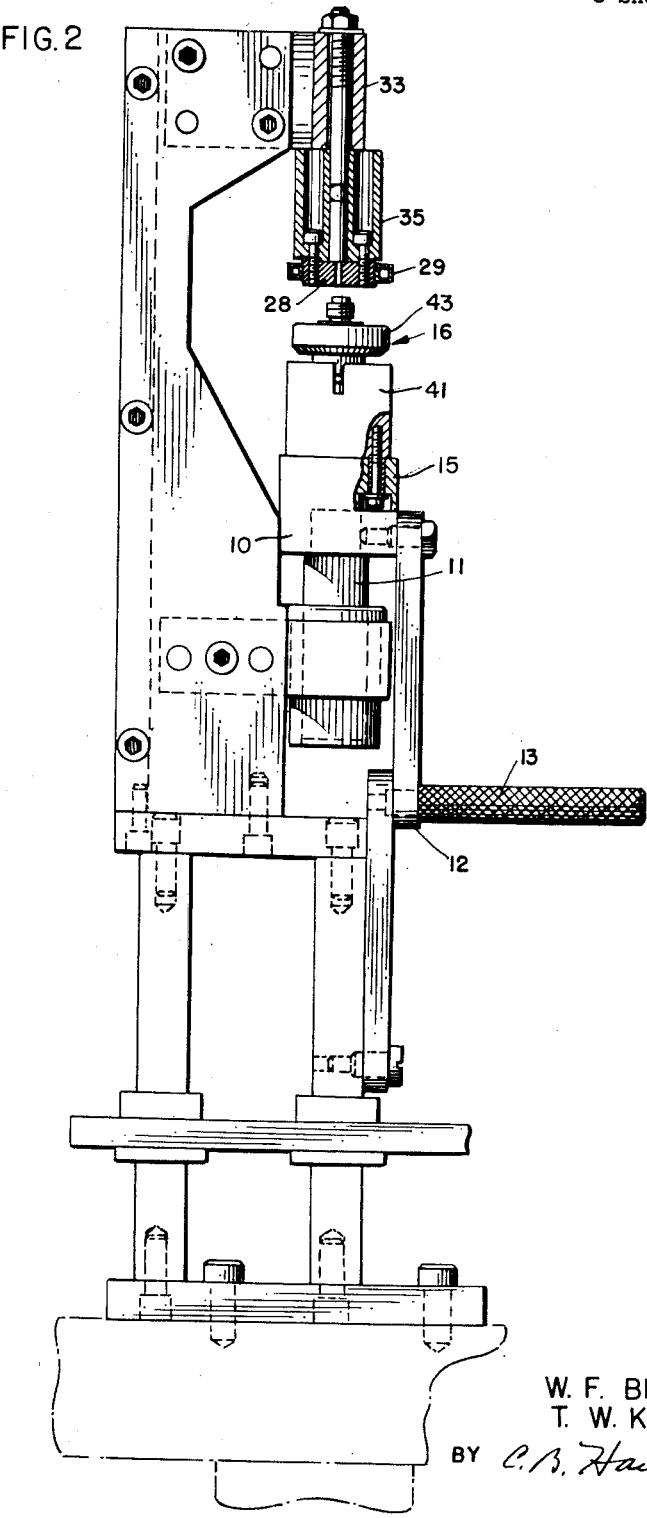
Fig. 2 is a partially, sectional side elevational view of the apparatus shown in Fig. 1.
Figure 3:
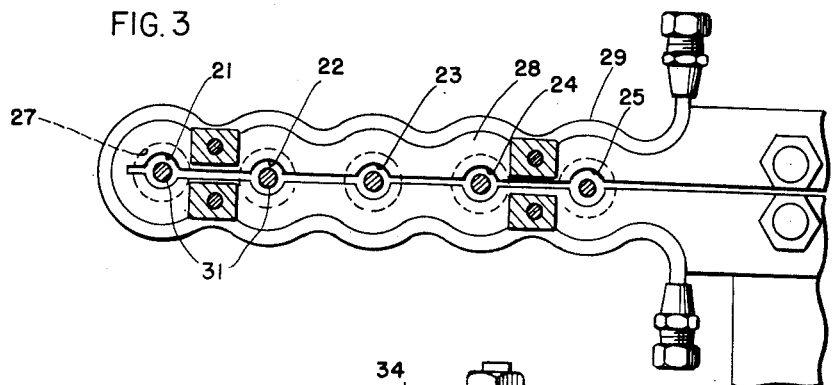
Fig. 3 is a fragmentary, horizontal section taken along line 3—3 of Fig. 1.
Figure 4:
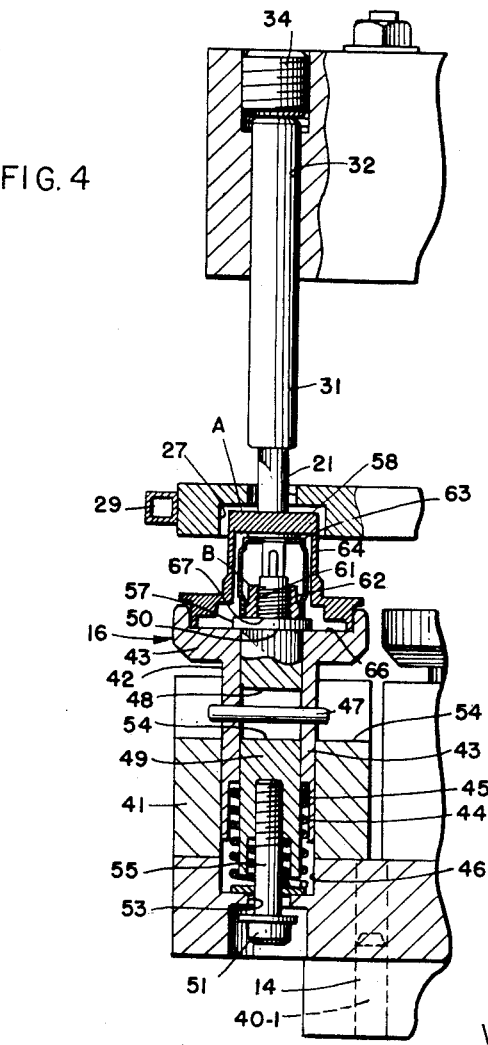
Fig. 4 is an enlarged fragmentary vertical section of a portion of the apparatus shown in Fig. 1.

Referring now in detail to the drawings, there is shown therein a platen 10 mounted slidably by a guide rod 11 and a bushing 9 and movable by a manually operable toggle-joint linkage 12 having a handle 13. A plate 15 liftable from pins 14 serves to mount thereon support assemblies 16, 17, 18, 19 and 20 in alignment with holes 21, 22, 23, 24 and 25 concentric with sockets 27 in an elongated split induction coil 28 along the exterior of which a water cooling tube 29 extends. Each of the support assemblies is aligned with one of rods 31 of "Lavite" or other nonconductive, heat resistant materials mounted adjustably in bores 32 of a supporting frame 33 by adjustment plug nuts 34, and the lower ends of the rods 31 extend through the holes 21 through 25 to a level just below the ends of the sockets 27. Insulating blocks 35 serve to support the split induction coil 28 and the cooling tube 29 from the frame 33.

Each of the assemblies 16 through 20 includes a cylindrical guide 41 in which a shank 42 of a holder 43 is slidably mounted, and is urged upwardly by a compression spring 44 nesting in a counterbore 45 and a counterbore 46 formed in the plate 15. A pin 47 secured to the holder 43 extends through an elongated clearance slot 48 in a rod 49 having a shoulder 50 on the upper end thereof and through slots 54 to spline the holder 43 and the rod 49 to the guide 41. A cap screw 51 threaded into a bore 52 in the rod 49 projects through a bore 53 in the plate 15 to limit upward movement of the rod 49 by a compression spring 55. A collar 57 limits upward movement between the holder 43 with respect to the rod 49. On the upper end of each of the rods 49, there is provided a threaded member 61 for receiving a nut 62 to which has previously been brazed a cup-like shell 63 to accurately locate the shell 63 relative to the rod 49. Socket bottoms 66 of the holders 43 are parallel to bottoms 67 of the nuts 62.

Operation

With the platen 10 in its lowermost or loading position, the plate 15 having the nuts 62 and the shells 63 threaded onto the threaded members 61 is placed on the pins 14. Thin discs or rings 58 of silver solder or the like are placed on the tops of the shells 63, and caps 64 are placed over the shells 63. The toggle 12 then is actuated manually to move the caps 64 upwardly into engagement with the Lavite rods 31 which press the caps 64 firmly against the rings 58, and the upper ends of the caps and the shells 63 and the solder rings are spaced precisely relative to one another and to the walls of the sockets 27. Since the bottoms 66 of the supports 43 are in planes perpendicular to the axes of the threaded members 61, the rims of the caps 64 are located in planes precisely parallel to the bottoms 67 of the nuts 62, in which relative positions these parts are brazed. The induction heating coil 28 then is actuated by suitable well know means (not shown) to melt the soldered disc and heat the upper portions of the caps 64 and the shells 63 to securely braze these elements together. Then the heat is turned off to permit the solder to solidify to rigidly secure the caps and shells together in precisely spaced positions relative to one another. Then the toggle 12 is actuated to lower the platen 10, the plate 15 carrying the brazed elements is removed from the apparatus and another plate (not shown) identical with the plate 15 and carrying support assemblies having caps and shells to be brazed is placed in the apparatus for another brazing operation, after which the caps 64 are rotated to unthread the nuts 62 from threaded members 61 of the removed plate 15, which then is reloaded.

The above-described apparatus may be quickly loaded and unloaded, and serves to accurately position a multitude of parts to be brazed together, moves them up to the multi-socket type induction coil 28, which simultaneously heats the several articles to be brazed together, and is simple, rugged and inexpensive in construction.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A brazing apparatus, which comprises an annular split induction coil provided with a bore through the central portion thereof, means for resiliently holding a shell in alignment with the bore, a holder for supporting a second shell into which the first shell is nested, means for supporting the holder resiliently, means for urging the holding means away from the holder, means for moving the holder and the holding means into the induction coil, and Lavite rods extending through the bore and the induction coil for limiting movement of the shells into the coil.

2. A brazing apparatus, which comprises an induction coil provided with a bore through the central portion thereof and a counterbore forming a socket, means for supporting a pair of nested cup-shaped articles having a piece of brazing material therebetween in alignment with the counterbore, means for moving the supporting means so as to move the articles and the piece into the socket, and a rod composed of heat resistant, electrically non-conductive material for limiting movement of the articles into the socket.

3. A brazing apparatus, which comprises an elongated split induction coil provided with a plurality of sockets therein for receiving articles and also being provided with openings aligned with the sockets, means movable toward and away from the coil, a quick-removable holder mountable on the movable means for supporting a plurality of pairs of articles to be brazed together, and means projecting through the openings for positioning parts to be brazed together precisely in the sockets.

4. A brazing apparatus, which comprises an elongated split induction coil provided with a plurality of sockets therein for receiving articles, a platen movable toward and away from the coil, locating pins projecting from the platen, a holding assembly having sockets designed to receive the pins when placed on the platen for locating pairs of parts to be brazed in alignment with the sockets, and means for positioning parts to be brazed together precisely in the sockets.

5. A brazing apparatus, which comprises a C-shaped frame, a plate movable toward and away from one arm of the frame, a holding assembly having a plurality of article supports removably mounted on the plate, quick-detachable means for mounting the assembly on the plate, an elongated split induction coil provided with a plurality of bores therethrough and counterbores facing the article supports, means supporting the induction coil on one arm of the frame, and a plurality of heat resistant electrically non-conductive rods supported by the last-mentioned arm of the frame and projecting through the bores in the induction coil.

6. A brazing apparatus, which comprises a C-shaped frame, a plate movable toward and away from one arm of the frame, a plurality of article supports mounted on the plate for holding articles thereon in nested relation, induction heating means provided with a plurality of sockets facing the article supports, and means for moving the plate toward the induction heating means to move nested articles mounted on the supports into the sockets.

7. A brazing holder, which comprises a socket for receiving a rim of a cap, a threaded rod for supporting a cup-shaped shell threaded thereon, means mounting the rod and the socket in concentric positions and permitting longitudinal movement therebetween, means normally urging the socket in such a direction as to hold the cap out of engagement with a solder piece positioned between the closed ends of the shell and the cap, a stop, and means for moving the rod and the socket toward the stop, whereby the cap is pushed into engagement with the solder disc.

8. A brazing apparatus, which comprises a support having a socket therein, a sleeve having a cup-shaped end mounted slidably in the socket for receiving the rim of a cup-shaped article, a rod having a threaded end portion for holding a second cup-shaped article threaded thereon and designed to receive the first-mentioned article thereon, means normally urging the rod beyond the sleeve, means limiting movement of the rod relative to the sleeve, means normally urging the sleeve away from the bottom of the socket, a cup-shaped induction heating element having a bore in the end thereof, a stop element of electrically non-conductive heat resistant material extending through the bore, and means for moving the support toward and away from the induction heating element.

References Cited in the file of this patent

UNITED STATES PATENTS

| 1,515,593 | Elsdon-Dew et al. | Nov. 18, 1924 |
| 2,271,916 | Denneen et al. | Feb. 3, 1942 |
| 2,353,130 | Dravneek | July 11, 1944 |
| 2,477,129 | Johnson | July 26, 1949 |

FOREIGN PATENTS

| 562,690 | Great Britain | July 12, 1944 |